United States Patent Office 3,406,011
Patented Oct. 15, 1968

3,406,011
PROCESS FOR THE MANUFACTURE OF HYDROXYLAMMONIUM SALTS
Hans Zirngibl, Duisburg, Alexander Dornemann, Krefeld-Bockum, Rudolf Gerken, Krefeld, Heinz Heine, Krefeld-Urdingen, Horst Meyer, Krefeld, and Johannes Weise, Krefeld-Bockum, Germany, assignors to Farbenfabriken Bayer Aktiengesellschaft, Leverkusen, Germany, a corporation of Germany
No Drawing. Filed Dec. 16, 1966, Ser. No. 602,157
Claims priority, application Germany, Dec. 28, 1965, F 48,021; Nov. 28, 1966, F 50,788
11 Claims. (Cl. 23—190)

ABSTRACT OF THE DISCLOSURE

Process for the production of hydroxyl-ammonium salts by reduction of nitric oxide with hydrogen in an aqueous mineral acid solution in the presence of noble metal catalysts, said catalyst being periodically or continuously treated with oxygen thereby maintaining the selectivity and activity of the catalyst at a desired level.

Field of the invention

This invention relates to a process for the production of hydroxyl-ammonium salts.

Description of the prior art

It is known that hydrogen and nitric oxide can be reacted in an acid medium in the presence of a noble metal catalyst to form hydroxyl-ammonium salts (German Patent No. 968,363 and German Auslegeschrift No. 1,177,118). The noble metals can be used by themselves or on acid-resistant supports. Furthermore, it is known that the formation of ammonia occurs as a concurrent reaction in addition to the formation of the hydroxylamine salt.

Numerous processes have been described for restricting this secondary reaction. For example, it has been proposed to improve the selectivity of the catalysts by means of additives (German Patent No. 885,396). Furthermore, it has been proposed to improve the reaction yield and the effective life of the catalysts. For example, it has been found that the use of sulphuric acid which has been freed both from various metal ions and also from reducing compounds allows the activity of the catalysts to be retained for a substantially longer time (German Patents Nos. 921,145 and 1,124,024). It has furthermore been found that a periodic gasifying of the catalyst with nitrogen monoxide prevents the deterioriation in the conversion which deterioriation increases as a function of time (see German Patent No. 1,113,448).

Summary of the invention

It is an object of the present invention to provide a process for the production of hydroxyl-ammonium salts with high yields. It is another object of the present invention to provide a process for the production of hydroxyl-ammonium salts with catalyst maintained at a high selectivity and activity level. Other objects will be described in the following description.

A process for the production of hydroxyl-ammonium salts from nitric oxide and hydrogen in the presence of noble metal catalysts at tmeperatures of from 0° C. to 80° C. has now been found, in which the catalyst is periodically or continuously treated with oxygen for a time sufficient to reactivate the catalyst to the desired activity and selectivity. It was surprisingly found that the activity and selectivity of the noble metal catalysts can be kept approximately at a constant value over a very long period of time by a periodic or continuous intermediate treatment with oxygen. The treatment can take place both in aqueous and in acid solution. As the acid, it is advantageous to use the sulphuric acid which is preferably also in the reaction of NO with hydrogen. The treatment can be carried out at temperatures between 0° C. and 80° C. and it is advantageous to work at temperatures of from 30° C. to 50° C.

By treating with oxygen is meant contacting the noble metal catalyst, preferably for from 2 to 60 minutes, with oxygen itself or with an agent containing free oxygen, e.g., air or one which easily decomposes to form oxygen, e.g., peroxidic compounds such as hydrogen peroxide, ammonium peroxide disulfate, perborates, and the like or permanganate compounds such as potassium permanganate.

Description of the preferred embodiments

The treatment of the catalyst occurs either in the reaction medium or after separation of the catalyst and resuspending in water or acid solution by bringing the catalyst continuously or periodically into intimate contact with oxygen. In a preferred embodiment, the catalyst is, depending on when decrease in activity begins, periodically treated with free oxygen or air. This periodic treatment is performed, depending upon the decrease in activity, at intervals of from 5 to 200 hours.

Another possibility of maintaining the activity and selectivity of the catalyst according to the present invention is the continuous admixture of oxygen with the reaction gases in amounts of 0.01 to 1.0% by volume, preferably of 0.05 to 0.2% by volume, based on the amount of NO used.

The treatment of the catalyst, when performed periodically, normally occurs after the neutralization of the reaction mixture by the reaction gases in such cases where the reaction is conducted batchwise. The nitric oxide-hydrogen mixture in the reaction vessel is displaced by nitrogen and thereafter the catalyst is gased with oxygen or air, the amount of oxygen or the duration of gasing depending on the state of activity of the catalyst. After removing the catalyst from the reaction mixture and resuspending in fresh acid, the production of hydroxyl-ammonium salt can be started again. Similarly the catalyst can be reactivated not prior but after removal from the reaction mixture.

In the continuous synthesis of the hydroxyl-ammonium salt, wherein the removal of the reaction mixture and the catalyst occurs directly in the reaction vessel by appropriate means, the introduction of the NO/$H_2$ mixture is periodically interrupted. Thereafter the reaction vessel is flushed with nitrogen prior to the feeding in of oxygen or air. Thereafter the air or oxygen is replaced by nitrogen, whereupon the synthesis is continued. The concurrent addition of oxygen or air to the synthesis gas for maintaining the activity and selectivity of the catalyst at an optimum level can be accomplished in the continuous as well as in the batchwise production of hydroxylamine.

The production of the hydroxylamine salts is carried out as known per se by introducing nitrogen oxide and hydrogen in an aqueous mineral acid solution containing the suspended catalyst therein. In the discontinuous process, the synthesis gas is fed into the acid catalyst mixture until the acid is nearly consumed, whereby preferably a pH of 2.5 is not exceeded, to avoid the formation of substantial amounts of ammonium or ammonium salts. The hydroxyl-ammonium salts so obtained are, after removing the catalyst, either precipitated by cooling the reaction solution or the reaction solution with the hydroxylamine salt contained therein is directly used for synthesis, e.g., the production of lactams. The salts can also be used as reducing agents, as photographic developers, as stabilizers, etc.

In the continuous process for the manufacture of hydroxylyamine, into the reaction vessel fresh acid is conducted periodically or continuously whereby part of the reaction solution is removed together with the hydroxylamine salt formed. The process also can be carried out stepwise, whereby the reaction mixture is led from step to step, each step being maintained at a constant pH range. The first step starts with the fresh acid, whereby from the last step the substantially neutralized reaction solution together with the hydroxylamine salt is removed.

The reaction temperature is between 0 and 80° C., preferably the reaction is carried out at a temperature of between 40 and 60° C. The concentration of free acid should amount to between 0.01 and 5.0 N; the molar ratio of $NO:H_2$ is normally to be maintained at a range of between 1:1.5 and 1:3.0, preferably of between 1:1.6 and 1:2.0. For reason of economics, the reaction is performed at normal pressure, however, it is possible to apply superpressure also. As acids, the strong mineral acids such as sulfuric acid, hydrochloric acid, phosphoric acid, nitric acid or the like are used.

The metals of the platinum series and advantageously platinum itself may be used as noble metal catalysts. Activated carbon or graphite can be employed as an acid resistant support material for the noble metals. It is known that activated carbon, used as a support material, has a better activity and selectivity than graphite. However, activated carbon has the disadvantage that with increasing use, the particles disintegrate to form smaller particles which increase the filtration time necessary to remove the catalyst and thus there are serious time losses caused by the filtering off of the reaction solution, which is periodically necessary.

It has also been found that the increase in filtration time described above can be substantially avoided by using catalysts, the support materials of which consist of a mixture of activated carbon and graphite. The preferred support materials consist of from about 10 to 50% by weight activated carbon and 50 to 90% by weight graphite, advantageously about 20% of activated carbon and 80% of graphite. Such supports have a very high and constant selectivity and activity, without the rate of filtration increasing substantially as the period of use increases. The catalysts to be used are prepared in the usual manner, for example, by introducing activated carbon and graphite into dilute HCl, treating the suspension with hexachloroplatinic acid, heating the suspension to, for example, 70° C. and adding, for example, formic acid. This catalyst, comprising a mixed support of graphite and activated carbon, can be reactivated by contacting with oxygen in the manner described above. However, even without such reactivation, the catalyst according to the invention shows a surprisingly constant activity and selectivity while at the same time not substantially increasing filtration rates.

The expressions "activity" and "selectivity" as used in the present application are defined as follows: by activity, is meant the percentage of the NO precipitated in the hydroxylammonium salt and ammonium salt, related to the total quantity of NO introduced; the selectivity is defined as 100 times the ratio of mols of hydroxylammonium salt formed to the sum of the mols of hydroxylammonium salt and ammonium salt formed.

The invention is illustrated by the following examples.

Example 1 (Prior art)

25 g. of a 1% Pt/C catalyst were suspended in 1 litre of approximately 20% $H_2SO_4$ and gasified at 40° C., while stirring vigorously with an $NO/H_2$ mixture with a constant charge of about 10 litres of NO per hour. After introducing 4.0 to 4.1 mols of NO, the catalyst and solution were separated, the catalyst was introduced again with fresh sulphuric acid and fresh $NO/H_2$ was introduced. The process was repeated until the conversion fell to low values.

Example 2 (According to the invention)

Up to the separation of catalyst and solution, the procedure was in accordance with Example 1. The catalyst after separation was washed with $H_2O$ and suspended in 500 ml. of $H_2O$. After adding approximately 10 ml. of 3% $H_2O_2$, the solution was left at about 40° C. for approximately 15 minutes while stirring vigorously, and then 500 ml. of approximately 40% $H_2SO_4$ were added. Gasification was once again carried out. The process was repeated more than 30 times and finally stopped without it being possible to detect any deterioration in the overall result.

The results of Experiments 1 and 2 have been set out in the following Table 1.

TABLE I

| Example 1 | | | Example 2 | | |
|---|---|---|---|---|---|
| No. of through-put | Total conversion, percent | Selectivity | No. of through-put | Total conversion, percent | Selectivity |
| 4 | 81.5 | 66 | 4 | 82.5 | 67 |
| 5 | 81.0 | 70 | 5 | 81.0 | 68 |
| 6 | 91.0 | 57 | 6 | 90.0 | 64 |
| 7 | 85.0 | 73 | 7 | 85.0 | 73 |
| 8 | 89.0 | 71 | 8 | 90.5 | 72 |
| 9 | 83.0 | 83 | 9 | 86.0 | 72 |
| 10 | 82.0 | 84 | 25 | 86.5 | 83 |
| 11 | 72.0 | 88 | 26 | 90.0 | 78 |
| 12 | 52.0 | 94 | 27 | 79.0 | 73 |
| 13 | 41.0 | 96 | 20 | 83.5 | 74 |
| 14 | 9.0 | 90 | 29 | 77.0 | 84 |
| | | | 30 | 90.0 | 83 |

Example 3

Example 2 was repeated using the following as the catalyst support:
(a) Graphite;
(b) Activated carbon; and
(c) A mixture of 80 parts of graphite and 20 parts of activated carbon.

The filtration times (F.T.) in minutes are indicated in the following Table 2.

TABLE 2

| No. of throughput | Catalyst (a) | | | Catalyst (b) | | | Catalyst (c) | | |
|---|---|---|---|---|---|---|---|---|---|
| | Act. | Sel. | F.T. | Act. | Sel. | F.T. | Act. | Sel. | F.T. |
| 1 | 91 | 62 | 3.5 | 88 | 68 | 17 | 77 | 31 | 4.5 |
| 2 | 93 | 76 | | 87 | 69 | | 92 | 78 | |
| 3 | 92 | 77 | | 87 | 82 | | 91 | 41 | |
| 4 | 93 | 82 | | 81 | 70 | | 93 | 81 | |
| 5 | 93 | 82 | | 85 | 85 | | 87 | 86 | |
| 6 | 93 | 75 | | 86 | 73 | | 92 | 88 | |
| 7 | 93 | 80 | | 89 | 84 | | 93 | 87 | |
| 8 | 93 | 90 | | 88 | 84 | | 92 | 84 | |
| 9 | 97 | 75 | | 86 | 86 | | 90 | 86 | |
| 10 | 90 | 70 | | 87 | 86 | 21 | 93 | 83 | |
| 11 | 90 | 62 | | 88 | 91 | | 93 | 77 | |
| 12 | 92 | 65 | 3.5 | 79 | 91 | | 94 | 86 | 5.0 |
| 45 | 80 | 87 | | 85 | 95 | | 95 | 81 | 8.0 |
| 46 | 84 | 84 | 4.0 | 86 | 94 | | 92 | 85 | |
| 47 | 90 | 84 | | 87 | 94 | 35 | 95 | 82 | |
| 58 | 90 | 82 | | 87 | 93 | | 92 | 85 | |

TABLE 2—Continued

| No. of throughput | Catalyst (a) | | | Catalyst (b) | | | Catalyst (c) | | |
|---|---|---|---|---|---|---|---|---|---|
| | Act. | Sel. | F.T. | Act. | Sel. | F.T. | Act. | Sel. | F.T. |
| 80 | 85 | 79 | 4.5 | 65 | 97 | 45 | 78 | 81 | |
| 81 | 87 | 82 | | 52 | 97 | | 88 | 77 | |
| 82 | 86 | 79 | | 59 | 98 | | 93 | 81 | 11.0 |
| 145 | 72 | 78 | 4.8 | | | | 91 | 70 | |
| 146 | 91 | 86 | | | | | 89 | 74 | |
| 147 | 80 | 83 | | | | | 73 | 82 | 16.0 |
| 181 | 59 | 89 | | | | | 84 | 85 | |
| 182 | 63 | 86 | | | | | 85 | 84 | |
| 183 | 35 | 89 | | | | | 84 | 84 | |
| 184 | 52 | 85 | 5.0 | | | | 84 | 84 | 19.0 |

Act.=activity.   Sel.=selectivity.

Whereas only a slight superiority over the comparison catalysts is found up to the 48th throughput of the mixed support catalyst, its superiority becomes clearly apparent with increasing age. For example, with the 184th throughput, the filtration time is increased to not quite four times by comparison with the graphite carrier catalyst; the activated carbon catalyst could no longer be used even after the 82nd throughput, because of filtration difficulties.

Example 4

25 g. of a Pt/C catalyst are suspended in 1 litre of an approximately 20% $H_2SO_4$ and gasified at 40° C., while vigorously stirring with a $NO/H_2$ mixture with a constant change of about 10 litres of NO per hour.

After introducing 4.0 to 4.1 mols of NO, the catalyst and solution were separated, the catalyst was introduced again with fresh sulphuric acid and fresh $NO/H_2$ was introduced. The process was repeated until the conversion fell to low values.

Example 5

In accordance with Example 4, an agitator vessel was charged with the catalyst and operated in the same manner for 10 throughputs. In the case of the 10th throughput, the $NO/H_2$ mixture was replaced by nitrogen. Thereafter within 10 minutes 3 litres of air were fed in. After flushing with nitrogen, the catalyst was separated from the reaction solution, resuspended in fresh acid and gasified again with $NO/H_2$. The reactivation with air was repeated during the first 100 throughputs after every 10th run, thereafter the reactivation occurred after every 5th run. The results of experiments 4 and 5 have been set out in the following Table 3.

TABLE 3

| Example 4 | | Example 5 | |
|---|---|---|---|
| NO conversion to $NH_2OH+NH_3$ (percent) | Selectivity (percent) | No conversion to $NH_2OH+NH_3$ (percent) | Selectivity (percent) |
| 1 — 93.4 | 88.7 | 1 — 92.5 | 88.9 |
| 2 — 95.6 | 89.5 | 2 — 93.6 | 90.3 |
| 3 — 94.9 | 90.3 | 3 — 94.0 | 91.2 |
| 4 — 94.7 | 91.2 | 4 — 93.3 | 91.4 |
| 5 — 93.2 | 91.0 | 5 — 91.9 | 92.1 |
| 6 — 91.9 | 90.4 | 6 — 94.2 | 92.1 |
| 7 — 94.2 | 91.9 | 7 — 93.4 | 92.5 |
| 8 — 93.4 | 92.5 | 8 — 91.1 | 92.3 |
| 9 — 95.6 | 93.2 | 9 — 92.2 | 93.5 |
| 10 — 90.8 | 93.5 | 10 — 91.8 | 94.0 |
| 11 — 91.0 | 92.2 | 11 — 94.3 | 90.3 |
| 12 — 86.0 | 93.0 | 12 — 93.2 | 90.8 |
| 13 — 82.4 | 94.0 | 13 — 91.3 | 91.0 |
| 14 — 57.8 | 95.0 | 14 — 93.8 | 91.3 |
| 15 — 45.2 | 95.0 | 15 — 92.7 | 92.4 |
| | | 20 — 91.8 | 93.8 |
| | | 21 — 95.0 | 91.2 |
| | | 25 — 94.1 | 93.0 |
| | | 30 — 92.0 | 93.2 |
| | | 31 — 96.1 | 91.1 |
| | | 40 — 99.9 | 93.2 |
| | | 41 — 94.5 | 91.0 |
| | | 50 — 91.8 | 93.8 |
| | | 51 — 95.0 | 92.5 |
| | | 70 — 93.8 | 94.7 |
| | | 71 — 94.7 | 91.8 |
| | | 100 — 91.9 | 93.8 |
| | | 101 — 94.9 | 89.9 |
| | | 150 — 92.3 | 94.2 |
| | | 151 — 96.1 | 92.3 |
| | | 200 — 92.5 | 94.5 |
| | | 201 — 94.1 | 91.2 |

Example 6

A stirring vessel, as described in Example 4, additionally equipped with a filter unit, was charged with 25 g. of a Pt/C catalyst and 1 litre of the sulphuric acid. At a temperature of 40° C., the suspension was gasified with 10 litres of NO and 18 litres of $H_2$ per hour. After 9.5 hours, the acid was neutralized to a normality of 0.3 by the hydroxylamine and ammonia formed. The $$(NH_3OH)_2SO_4$$

concentration amounted to about 270 g./l. Now, in accordance with the NO conversion, 100–110 ml. of 4.5 N $H_2SO_4$ was added continuously per hour, whereas via the filter unit an about 8–10% larger amount of hydroxylamine sulfate was removed. (The salt formation effects an increase of volume). After 170 hours a slight decrease of the NO conversion was observed, and after the following 20 hours the conversion decreased from the original value of 92–96% to 56%.

At this time the catalyst was reactivated by gasifying with air as described in Example 5. The conversion increased thereby immediately to 94%. Not until an additional 150 hours of processing a slight reduction in the conversion to 80% was observed. By intermediate aeration, the 94% conversion could be reestablished again. The reaction was run for about 2,000 hours with occasional intermediate aerations, but otherwise without any alterations, i.e., intermediate aerations kept the catalyst at the high activity and selectivity level.

Example 7

The reaction was carried out in accordance with Example 6 with the exception that the aeration was performed continuously. 0.05% by volume of oxygen, based on the NO amount used was added to the synthesis gas. The experiment was interrupted after 2,000 hours without the occurrence of any reduction of the conversion. The activity and selectivity of the catalyst remained unchanged throughout the experiment.

What we claim is:

1. In a process for the production of hydroxyl-ammonium salts by introducing gaseous nitric oxide and hydrogen in a molar ratio of between about 1 to 1.5 and 1 to 3 into an aqueous mineral acid solution having a free acid content of between 0.01 and 5 N and containing a catalyst of the platinum group, at temperatures of between 0° C. and 80° C., the improvement comprising contacting the catalyst with oxygen at a temperature between about 0 to 80° C. for a period sufficient to increase the activity and selectively of the catalyst.

2. The process according to claim 1 wherein the catalyst is contacted with oxygen by contacting it with an agent containing free oxygen or an agent which decomposes to form oxygen.

3. The process according to claim 2 wherein the agent is oxygen, air, a peroxide or a permanganate.

4. The process according to claim 1 wherein the catalyst is contacted with oxygen in the reaction medium 5. The process according to claim 1 wherein the catalyst and the reaction medium are separated and the catalyst is then contacted with oxygen.

6. The process according to claim 1 wherein the catalyst is continuously contacted during the reaction with free oxygen or air in the reaction mixture by admixing the oxygen or air with the reaction gasses in an amount of between 0.01 to 1.0% by volume oxygen based upon NO.

7. The process according to claim 1 wherein the catalyst is contacted periodically during the reaction with oxygen at intervals of from 5 to 200 hours.

8. The process according to claim 1 wherein the catalyst is supported upon a mixture of activated carbon and graphite.

9. The process according to claim 8 wherein the mixture contains from about 10 to 50% by weight activated carbon.

10. A catalyst for the production of hydroxyl ammonium salts by reduction of NO with hydrogen in an aqueous acid solution consisting essentially of a finely divided noble metal carried upon a support comprising a mixture of graphite and from about 10 to 50% by weight of activated carbon.

11. In a process for the production of hydroxyl-ammonium salts by introducing gaseous nitric oxide and hydrogen in a molar ratio of between about 1 to 1.5 and 1 to 3 into an aqueous mineral acid solution having a free acid content of between 0.01 and 5 N and containing a catalyst of the platinum group, at temperatures of between 0° C. and 80° C., the improvement consisting essentially of using as the catalyst a catalyst according to claim 10.

References Cited

UNITED STATES PATENTS

| | | | |
|---|---|---|---|
| 2,626,246 | 1/1953 | Naragon et al. | 252—416 |
| 3,133,790 | 5/1964 | Jockers | 23—190 |
| 3,295,925 | 1/1967 | Füeg et al. | 23—190 |

OSCAR R. VERTIZ, *Primary Examiner.*

H. S. MILLER, *Assistant Examiner.*